United States Patent
Balz et al.

(10) Patent No.: US 7,145,957 B1
(45) Date of Patent: Dec. 5, 2006

(54) METHOD FOR DETECTING THE REMAINING CARRIER POWER ON A MULTI-CARRIER SIGNAL THAT IS QAM-MODULATED IN THE 8K MODE ACCORDING TO THE DVB-T STANDARD

(75) Inventors: Christoph Balz, Munich (DE); Christina Lidl, Munich (DE)

(73) Assignee: Rohde & Schwarz GmbH, Munich (DE)

( * ) Notice: Subject to any disclaimer, the term of this patent is extended or adjusted under 35 U.S.C. 154(b) by 785 days.

(21) Appl. No.: 10/203,143

(22) PCT Filed: Nov. 17, 2000

(86) PCT No.: PCT/EP00/11437

§ 371 (c)(1), (2), (4) Date: Nov. 12, 2002

(87) PCT Pub. No.: WO01/60005

PCT Pub. Date: Aug. 16, 2001

(30) Foreign Application Priority Data

Feb. 7, 2000 (DE) ................................. 100 05 287

(51) Int. Cl.
H04L 5/12 (2006.01)
(52) U.S. Cl. .................................................. 375/261
(58) Field of Classification Search ........ 375/259–261, 375/316, 326, 342, 349, 366; 370/206, 210, 370/491, 503, 512
See application file for complete search history.

(56) References Cited

U.S. PATENT DOCUMENTS 4,881,245 A 11/1989 Walker et al.
6,359,938 B1 * 3/2002 Keevill et al. ............... 375/316
6,965,650 B1 * 11/2005 Akiyama et al. ............ 375/261

FOREIGN PATENT DOCUMENTS

| DE | 693 24 286 T2 | 8/1999 |
| DE | 199 01 902 A1 | 10/1999 |
| DE | 199 48 383 A1 | 4/2001 |
| EP | 0 441 731 A1 | 2/1991 |
| EP | 0 991 239 A2 | 9/1999 |

OTHER PUBLICATIONS

Balz C: "Effiziente Ermittlung Von Qualitaetsparametern Quadraturamplitudenmodulierter Signale Beim Digitalen Fernsehen (DVB)" Fernseh und Kinotechnik, Vde Verlag GMBH., vol. 50, No. 5, May 1, 1996 (1996-05-91), pp. 249–252, XP000592205 Berlin, DE ISSN: 0015-142 p. 250, col. 3, line 7-23, figure A, abstract.

* cited by examiner

Primary Examiner—Khanh Tran
(74) Attorney, Agent, or Firm—Lewis, Rice & Fingersh, L.C.

(57) ABSTRACT

The aim of the invention is to detect the remaining carrier power on a multi-carrier signal that is QAM-modulated in the 8K mode according to the DVB-T-standard. Said signal is provided with a central carrier which is situated in the center of the individual carriers and, at times, is a continual and, at times, a scattered pilot. The influence of the remaining carrier power on a carrier that is adjacent to the central carrier is detected and then converted to the central carrier.

4 Claims, 4 Drawing Sheets transmitted and received signal ... channel correction ... "corrected" signal $\underline{V}$ = residual carrier

METHOD FOR DETECTING THE REMAINING CARRIER POWER ON A MULTI-CARRIER SIGNAL THAT IS QAM-MODULATED IN THE 8K MODE ACCORDING TO THE DVB-T STANDARD

CROSS REFERENCE TO RELATED APPLICATIONS

This application is a §371 of PCT/EP00/11437 filed Nov. 17, 2000 which in turn claims priority to German Patent Application Serial No.: DE10005287.8 filed Feb. 7, 2000.

BACKGROUND

1. Field of the Invention

The invention relates to, and is based on, a method according to the precharacterising clause of the main claim.

2. Description of the Related Art

The so-called DVB-T standard describes a multi-carrier signal whose individual carriers which contain the user data are QAM-modulated, for example QPSK-, 16-QAM- or 64-QAM-modulated. The number of individual carriers which are used, and which are indexed by k, depends on the mode of the Fourier transform (FFT) which is used. In the 2 K mode, for example, k=0 to 1704, and in the 8 K mode k=0 to 6816. The totality of all the individual carriers transmitted within a fixed time range is referred to as a symbol, as shown by FIG. 1. Within this carrier range, some of carriers are 2PSK-modulated with additional information about the FFT mode which is used, the QAM order, etc., and these are referred to as TPS (Transmission Parameter Signalling) carriers.

Also present are many unmodulated individual carriers (pilots) which have a higher amplitude by the factor 4/3 compared with the mean square of the amplitudes of the aforementioned carrier types, and a rigid phase of 0° or 180°, as shown by the constellation diagram according to FIG. 2. The phase angle is determined by a pseudo-random number from a PRBS (Pseudo Random Binary Sequence). These pilots are referred to as continual pilots, they are found at fixed carrier positions and they are used for coarse adjustment of the frequency of the local oscillator in the receiver.

Likewise transmitted with increased amplitude and a rigid phase of 0° or 180° are the so-called scattered pilots. These are distributed uniformly over the carrier range and alternate their position within the carrier range from one symbol to the next, as shown by FIG. 1. Channel estimation at the carrier positions k is possible by interpolation of these scattered pilots along the frequency and time axes, and this information obtained by interpolation can then be used for channel correction of a perturbed DVB-T signal. With the aid of the constellation of one or more QAM-modulated individual carriers, it is possible to derive various transmission parameters which permit an assessment of the quality of the signal separately according to channel-specific parameters (e.g. signal-to-noise ratio) and influences caused on the transmission side (e.g. residual carriers or quadrature errors).

FIG. 3 shows the basic structure of a transmitter-receiver path of a system operating according to the DVB-T standard. In a data processing stage 1, the digital video signals to be transmitted are processed in the frequency domain and subsequently converted to the time domain (computer 2) by inverse Fourier transformation (IFFT). The I and Q components produced in this way are sent, after digitising in D/A converters 3 and amplification in amplifiers 4, to a quadrature mixture 6 in which they are mixed up to the desired output frequency with the components, mutually phase shifted by 90°, of a carrier signal 5 and are re-combined in an adder 7 and are broadcast.

In the receiver, on the input side, a back-conversion of the received input signal from the time domain to the frequency domain in turn takes place via FFT in the input stage 10, then the aforementioned channel correction is carried out by interpolation in a correction stage 11 with the aid of the scattered pilots, i.e. the received scattered pilots are corrected in such a way that, on the reception side, they respectively assume the ideal position according to FIG. 2 in the I/Q plane. In a subsequent signal evaluation device 12, the received video signals are processed further.

A DC component $U_I$ or $U_Q$ on the transmitter side, as schematically indicated in FIG. 3 by the adders 8, can lead to a perturbing residual carrier which shifts the constellation, in particular, of the central carrier of a DVB-T signal, as indicated in FIG. 3b (FIG. 3a is the ideal constellation of the central carrier). In the case of a multi-carrier signal of this type, the central carrier lies in the baseband at the frequency zero. In the 2 K mode, it lies at k=852, and in the 8K mode it lies at k=3408. In the 2 K mode, this central carrier is modulated with user data and only sometimes constitutes a scattered pilot, so that the residual carrier power can be determined directly with reference to it, as is the subject of the prior patent application 199 48 383.3, our reference P 22751. In an 8 K mode, the central carrier is not modulated and sometimes constitutes a continual pilot or a scattered pilot. The residual carrier cannot therefore be identified directly with reference to it.

SUMMARY

It is therefore an object of the invention to provide a method with which the residual carrier power can be determined in a straightforward way with reference to the central carrier even in the case of a DVB-T multi-carrier signal operating in an 8 K mode.

This object is achieved, on the basis of a method according to the precharacterising clause of the main claim, by the characterising features thereof. Two particularly advantageous possibilities for a practical embodiment of this are given by the dependent claims.

By evaluating the influence of the residual carrier power on a carrier neighbouring the central carrier, it is hence possible, according to the invention, to determine and display the residual carrier power of the central carrier even in the case of a DVB-T multi-carrier signal which is QAM-modulated in the 8K mode and in which the central carrier itself therefore remains unmodulated. This merely requires a conventional measuring receiver.

DETAILED DESCRIPTION OF THE PREFERRED EMBODIMENT(S)

The invention will be explained in more detail below with the aid of schematic drawings with reference to two exemplary embodiments.

Figure 1:
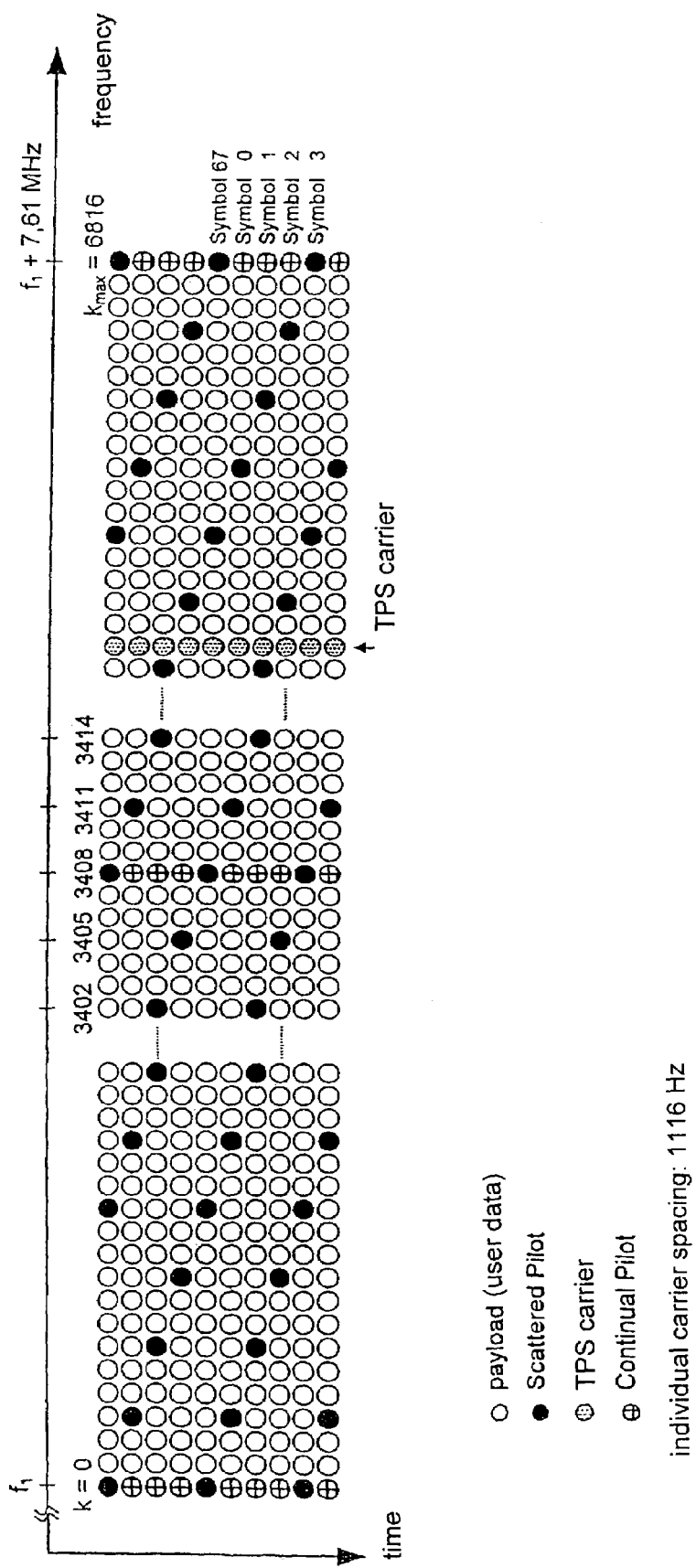
FIG. 1 shows a representation of a QAM-modulated multi-carrier signal in the 8 K mode according to the DVB-T standard.

In the DVB-T standard according to the ETS300744 specification, there is a scattered pilot at every third carrier position in a transmission frame, as shown by FIG. 1. The carriers lying in-between are pure user-data carriers. With the aid of these scattered pilots, it is possible to correct a perturbed DVB-T signal by a method represented in FIG. 4. By means of this, the user-data carriers lying in-between are also corrected. The correction system represented in FIG. 4 consists of a correction branch and a user-data branch. In the correction branch, the pilots of the incoming multi-carrier signal are firstly normalised, i.e. each individual received scattered pilot $S_k$ is divided by its ideal position $I_k$. In an unperturbed signal, all the scattered pilots hence appear with an amplitude of 1 and a phase angle of 0°.

Figure 5:
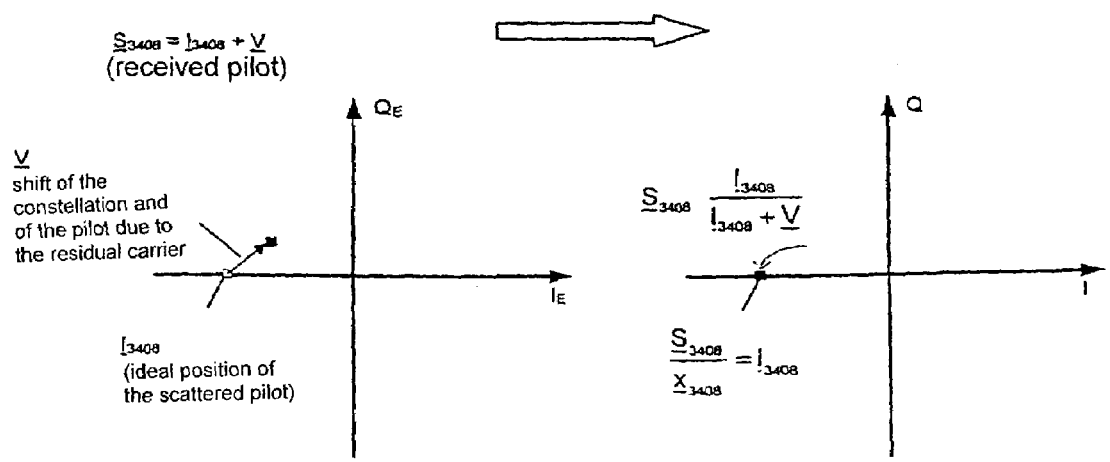
FIG. 5 shows a schematic diagram for calculating the residual carrier using the correction factor of the central carrier.
Figure 3:
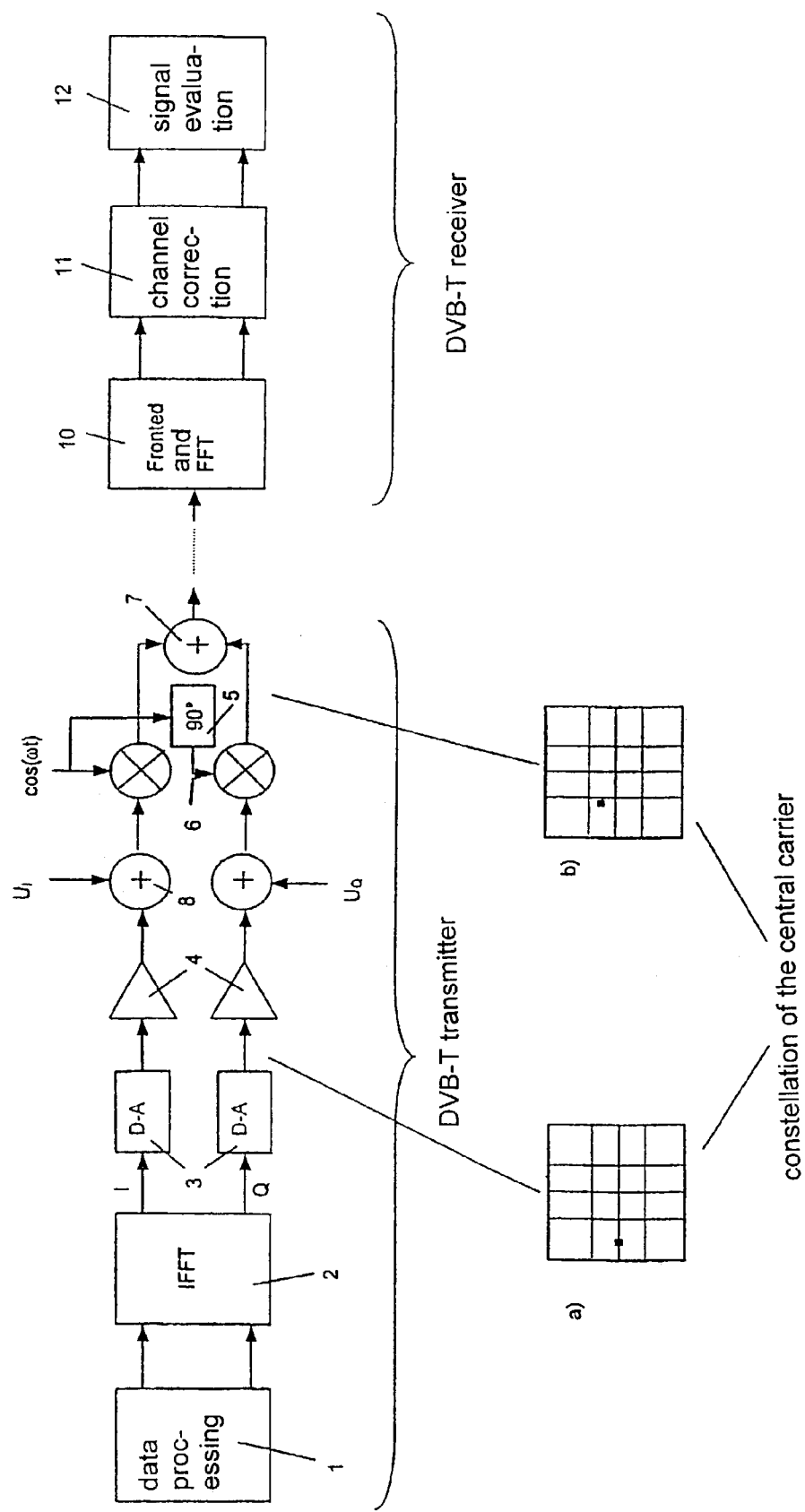
FIG. 3 shows the basic structure of a transmitter-receiver path of a system operating according to the DVB-T standard.
Figure 4:
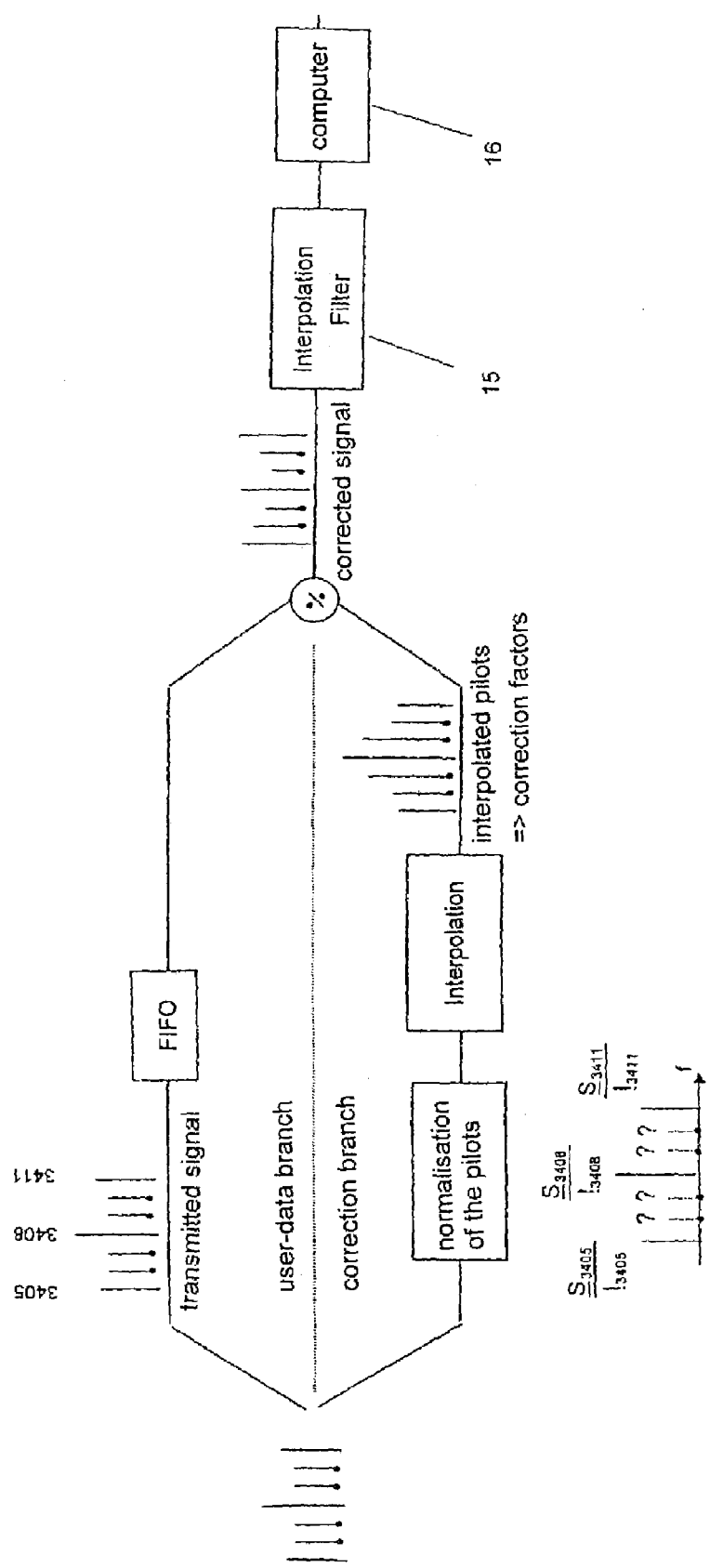
FIG. 4 shows a representation of a method to correct a perturbed DVB-T signal with the aid of scattered pilots.

In an 8 K mode multi-carrier signal, the central carrier has the position k=3408, as shown by FIG. 1 and FIG. 4. Assuming that an incoming signal in FIG. 4 is perturbed only by a residual carrier V, and not by any other influences, then all the carriers before the channel correction are located in an ideal position and only the central carrier with the position k=3408 is perturbed by the residual carrier. By means of the subsequent channel correction in the interpolation filter of the correction branch according to FIG. 4, in a known manner by interpolation between the scattered pilots for the carriers lying in-between/correction factors are identified, with which the carriers transmitted in the user-data branch are then corrected in an adder stage. By means of the correction, for example, the neighbouring carriers k=3406 are multiplied by a complex correction factor $x_{3406}$, the carrier k=3407 by a complex correction factor $x_{3407}$, the carrier k=3409 by a complex correction factor $x_{3409}$, etc. This leads to a rotation and compression of the respective constellation about its centre. If, however, the interpolation algorithm of the correction branch is known, then it is possible to infer the correction factor $x_{3408}$ of the central carrier by identifying the complex correction factor $x_k$ of a neighbouring carrier, and the residual carrier power V (amplitude) can be determined in this way. It is therefore only necessary, by means of an additional interpolation filter 15 according to FIG. 4, which has the same properties as the interpolation filter of the correction branch, to identify from the corrected carriers the correction factors $x_k$ (previously identified in the correction branch) of the carriers neighbouring the central carrier and to calculate the correction factor $x_{3408}$ of the central carrier by interpolation. For example, by means of the recovered correction factor $x_{3407}$ of the immediately neighbouring user-data carrier 3407 and by using the same known interpolation algorithm as was used in the correction branch according to FIG. 2, the complex correction factor $x_{3408}$ of the central carrier can be determined in a computer 16 and the residual carrier V that is shifting the central carrier can then be calculated therefrom, as schematically shown by FIG. 5.

With the assumption that the multi-carrier signal is perturbed exclusively by a residual carrier, the following applies for the received central carrier before the channel correction:

$$S_{3408}=I_{3408}+V$$

with $S_{3408}$=received signal of the central carrier, $I_{3408}$=ideal position of the central carrier as a scattered pilot, and V=shift due to the residual carrier.

The following furthermore applies:

$$I_{3408}=S_{3408}/X_{3408}$$

$x_{3408}$ is the correction factor determined by the channel correction.

The complex residual carrier is therefore given as follows:

$$V=I+Q=I_{3408}\,(x_{3408}-1)$$

where $I_{3408}$ is the predetermined known ideal position of the central carrier.

Figure 2:
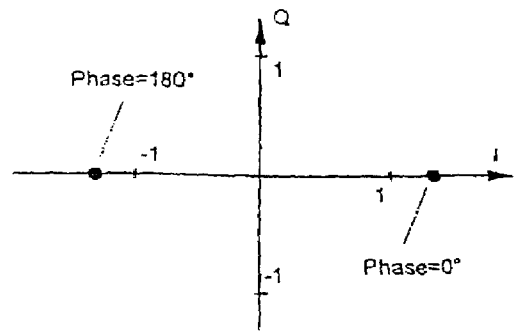
FIG. 2 shows the rigid phases of pilots of the signal of FIG. 1 in a constellation diagram.

Another possibility for determining the residual carrier in the 8 K mode involves evaluating the scattered pilots before the channel correction represented in FIG. 2. In this case, it is assumed that a perturbation in the channel has the same effect on both the central carrier and scattered pilots immediately neighbouring it. By determining the amplitude of one of the scattered pilots neighbouring the central carrier, it is hence possible to identify the residual carrier by subtraction, the scattered pilot immediately neighbouring the central carrier (k=3408) has the position 3405 or 3411, as indicated in FIG. 1. With the assumption that the signal is again perturbed only by a residual carrier, this means that it has no perturbing influence on the scattered pilots, for example k=3405, but rather only on the central carrier 3408. The residual carrier can therefore be identified by subtraction.

$$V=S_{3408}-S_{3405}$$

Expressed in terms of the neighbouring scattered pilot 3405, the residual carrier V is defined as follows:

$$V/S_{3405}=S_{3408}/S_{3405}-1$$

In this case, attention should be paid to the differing phase angle of the individual scattered pilots. Whereas both of the scattered pilots 3405 and 3411 immediately neighbouring the central carrier have a phase angle of 180°, that is to say the same phase angle as the central carrier, the next two scattered pilots 3402 and 3414 have a phase angle of 0°. This must be taken into account appropriately with the sign ±1 in the above formula.

The invention claimed is:

1. A method for determining the power of a residual carrier perturbing a QAM-modulated multi-carrier signal in the 8 K mode according to the DVB-T (Digital Video Broadcasting for Terrestrial) standard, the method comprising:

providing a QAM-modulated multi-carrier signal in the 8 K mode according to the DVB-T standard, said signal including a central carrier, said central carrier lying in the middle of individual carriers and being sometimes a continual pilot and sometimes a scattered pilot;

using an interpolation algorithm and evaluating scattered pilots in said multi-carrier signal to identify correction factors with which channel correction of all carriers in said multi-carrier signal is carried out;

recovering said correction factor of at least one user-data carrier directly or indirectly neighboring said central carrier from said channel-corrected multi-carrier signal;

determining by interpolation a correction factor of said central carrier from said correction factor of said at least one user-data carrier; and calculating a power of said residual carrier perturbing said central carrier from said correction factor of said central carrier.

2. The method of claim 1 wherein in said step of calculating,
said power of said residual carrier is calculated from a predetermined ideal position of said central carrier and said correction factor of said central carrier.

3. A method for determining the power of a residual carrier perturbing a QAM-modulated multi-carrier signal in the 8 K mode according to the DVB-T (Digital Video Broadcasting for Terrestrial) standard, the method comprising:
providing a QAM-modulated multi-carrier signal in the 8 K mode according to the DVB-T standard, said signal including a central carrier, said central carrier lying in the middle of individual carriers and being sometimes a continual pilot and sometimes a scattered pilot; and using an interpolation algorithm and evaluating scattered pilots in said multi-carrier signal to identify correction factors with which channel correction of all carriers in said multi-carrier signal is carried out;

wherein prior to said step of using:
a power of both said central carrier and a scattered pilot neighboring said central carrier are identified; and
said power of said residual carrier perturbing said central carrier is calculated by subtraction of said power of said scattered pilot neighboring said central carrier and said power of said central carrier.

4. The method of claim 3 wherein said power of said residual carrier is expressed in terms of said power of said neighboring scattered pilot used in said subtraction.

* * * * *